(12) United States Patent
Yamashita

(10) Patent No.: US 7,423,686 B2
(45) Date of Patent: Sep. 9, 2008

(54) IMAGE PICKUP APPARATUS HAVING AUTO-FOCUS CONTROL AND IMAGE PICKUP METHOD

(75) Inventor: Yuichiro Yamashita, Stanford, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 813 days.

(21) Appl. No.: 10/385,847

(22) Filed: Mar. 12, 2003

(65) Prior Publication Data

US 2004/0004670 A1 Jan. 8, 2004

Related U.S. Application Data

(60) Provisional application No. 60/364,678, filed on Mar. 14, 2002.

(51) Int. Cl.
  *G03B 13/00* (2006.01)
  *H04N 5/232* (2006.01)
  *H04N 5/225* (2006.01)
(52) U.S. Cl. .................. 348/348; 348/352; 348/169
(58) Field of Classification Search ......... 348/169–172, 348/345, 352, 348–350, 208.14
See application file for complete search history.

(56) References Cited

U.S. PATENT DOCUMENTS

| 4,912,500 | A | * | 3/1990 | Yokota et al. ............... 396/111 |
| 5,200,828 | A | * | 4/1993 | Jang et al. ................... 348/345 |
| 5,664,236 | A | * | 9/1997 | Utagawa ...................... 396/96 |
| 5,739,857 | A | * | 4/1998 | Kaneda ....................... 348/349 |
| 6,985,187 | B2 | * | 1/2006 | Han et al. .................... 348/452 |
| 7,038,709 | B1 | * | 5/2006 | Verghese .................... 348/169 |
| 7,046,822 | B1 | * | 5/2006 | Knoeppel et al. .......... 382/103 |

FOREIGN PATENT DOCUMENTS

| JP | 7-288732 | | 10/1995 |
| JP | 07288732 A | * | 10/1995 |
| JP | 9-43502 | | 2/1997 |
| JP | 2001-250931 | | 9/2001 |

\* cited by examiner

*Primary Examiner*—Ngoc-Yen T. Vu
*Assistant Examiner*—Adam L Henderson
(74) *Attorney, Agent, or Firm*—Fitzpatrick, Cella, Harper & Scinto

(57) ABSTRACT

To track a region of interest ("ROI") such as, for example, in a viewfinder of a camera, both the location and distance of a point in the ROI are estimated for a time in the future, based on actual measurements of locations and distances of the point at the present and in the past. Focus is controlled so as to focus on the point of interest based on the estimate of the future location and distance.

20 Claims, 9 Drawing Sheets

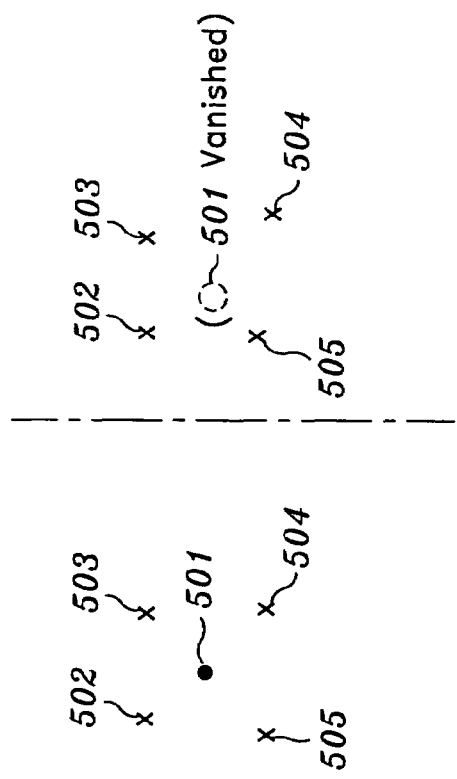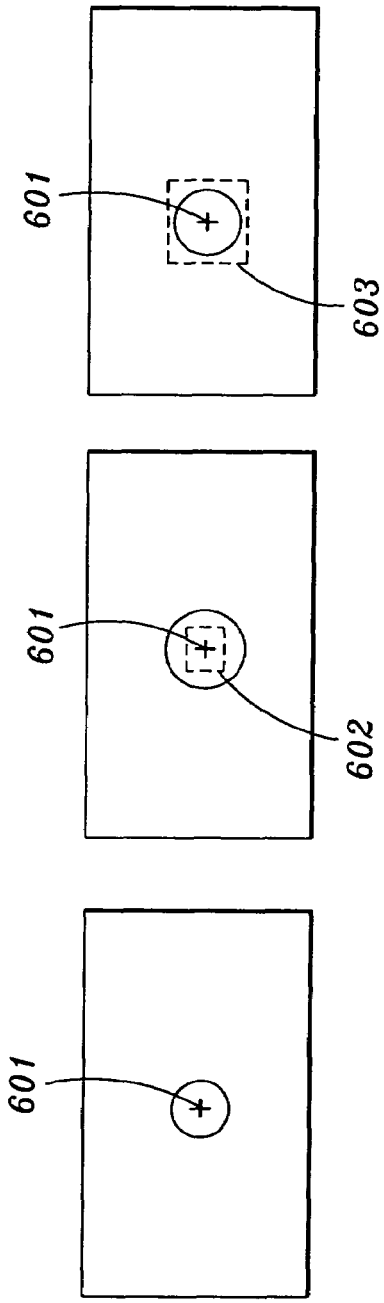

IMAGE PICKUP APPARATUS HAVING AUTO-FOCUS CONTROL AND IMAGE PICKUP METHOD

This application claims the benefit of U.S. Provisional Application No. 60/364,678, filed Mar. 14, 2002.

FIELD OF THE INVENTION

The present invention relates to imaging devices having an auto-focusing function and/or imaging method.

BACKGROUND OF THE INVENTION

The relevant prior art for auto-focusing with motion estimation estimates the motion of an object based only on distance information. Therefore, its estimation has been limited to the motion of objects which move along an optical axis. Japanese Patent Laid-Open No. H07-288732 concerns devices which store the shape of the object of interest, and tracks it using the shape as a template. However, these devices do not use the distance information of the object of interest, nor do they estimate the future motion of the object of interest. Therefore they can track and focus only very slow objects.

SUMMARY OF THE INVENTION

The present invention provides an improved auto-focus device and/or auto-focus method.

The invention provides an auto-focus device and/or auto-focus method having superior speed and precision of object tracking, provides an auto-focus device and/or auto-focus method for estimating and tracking the motion of a region of interest (ROI) while continuously focusing the object automatically, and provides an auto-focus device and/or auto-focus method having a simple user interface for tracking the objects.

The present invention estimates the position of the ROI and the distance to it using the projected locations of the ROI in the finder and the real distances to it, whose locations and distances have been acquired through the past and the present time. In addition, the camera system is controlled with the result of the estimation so that the user can focus on the ROI continuously.

The present invention reads out pixels related to the ROI, faster than that of the remaining image.

The present invention corrects errors of the estimation using the temporal continuity of the distance information.

BRIEF DESCRIPTION OF THE DRAWINGS

FIGS. 4 and 5, comprising FIGS. 5A and 5B, are views for explaining calculation of the region of interest ("ROI").

FIG. 6, comprising FIGS. 6A, 6B and 6C, depicts appearance of a viewfinder in a camera.

DETAILED DESCRIPTION OF THE PREFERRED EMBODIMENTS

Figure 1:
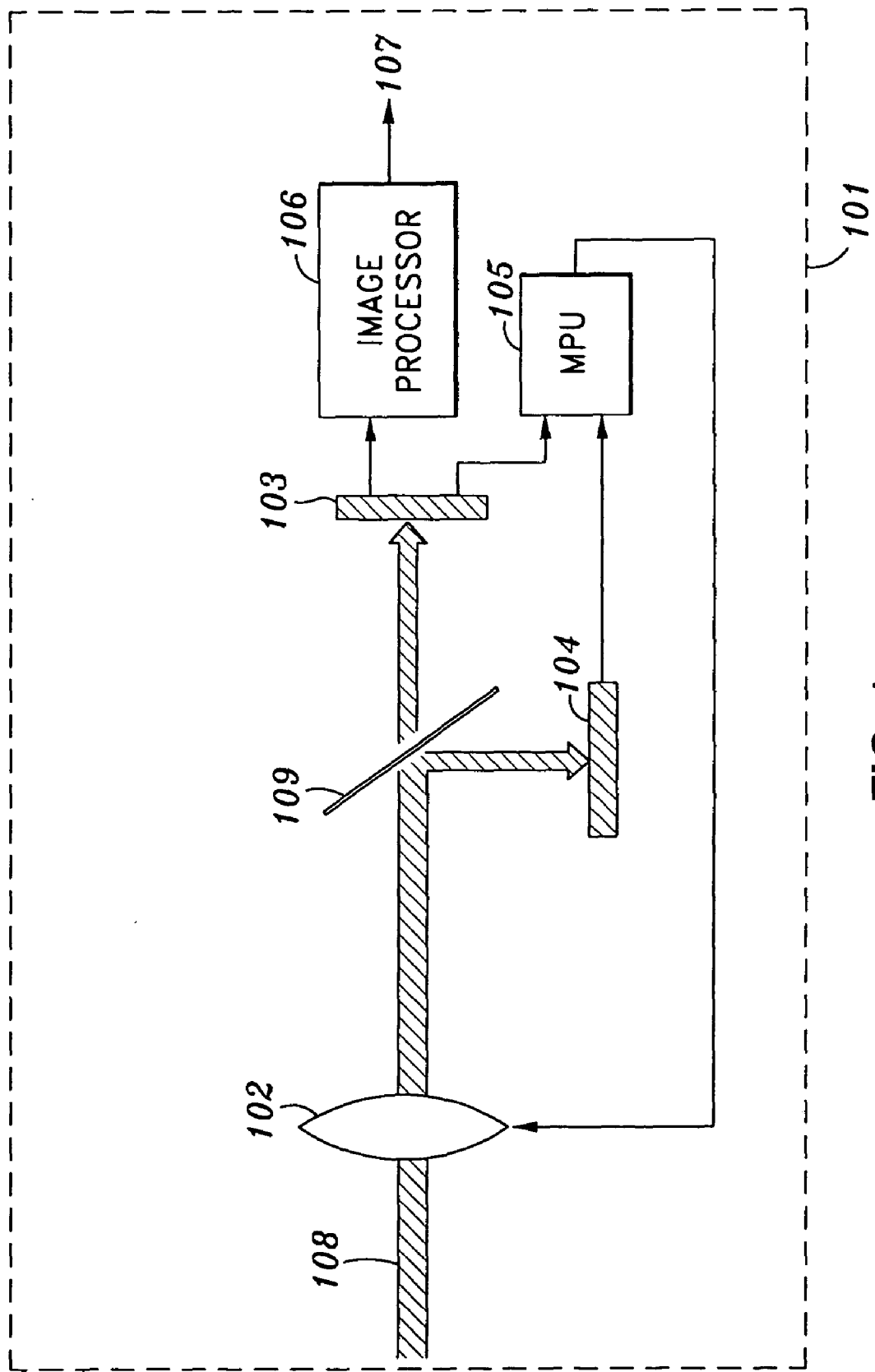
FIGS. 1, 2 and 3 respectively illustrate first, second and third embodiments according to the present invention.

FIG. 1 shows the first example of the present invention. A camera system is represented conceptually as 101, and the system consists of a lens 102, a half mirror 109, an area image sensor 103, an auto-focus sensor 104, a processor 105 (MPU) which processes the signal from both sensors, and an image processor 106 which processes the signal from the area image sensor 103 and yields to a final image signal 107. This picture is a conceptual drawing, hence this figure does not limit the configuration of the system. Processors 105 and 106 are shown as functional blocks, which does not necessarily mean that they are physically arranged in such a manner. 108 is also a conceptual drawing of a part of a ray coming to the camera system, with a part of it going to the auto-focus sensor 104 and the rest to the area image sensor 103.

Processor 105 receives a part of an image corresponding to the ROI, and estimates its position in the camera finder at a future time n+1 using the sequence of positions at time n, n−1, n−2 . . . of the ROI in the camera finder. Details will be described later.

Meanwhile, processor 105 receives a distance to the ROI from auto-focus sensor 104, and estimates its distance at a future time n+1, using the sequence of past distances at time n, n−1, n−2, . . . . Here, we can use any method to obtain the distance to the ROI which located at an arbitrary position in the finder. Examples are area auto-focus technology which has bean already in production and used by the CANON™ EOS™ 1 V camera, or also edge detecting auto focus technology used extensively in present digital video cameras.

A camera system is controlled with the estimated position and distance so that the camera can focus on the ROI at a future time n+1.

Here, the estimation has been done in discrete time, therefore the approximation can only hold around time n and n+1. When there is a long interval between n and n+1, the estimation cannot be interpolated exactly at all points of time within the interval so that sometimes it is difficult to focus around the ROI properly. For example, if we assume that the area image sensor 103 is read out with standard 1/30 second per entire frame, our estimation is valid only if the ROI stays in the given depth of field of the camera for 1/30 second. Processor 105 can interpolate the position and distance between one period (here, 1/30), however it is not enough to estimate the position and distance of ROI with higher speed.

To manage such a case, the image of ROI should preferably be read out with high temporal frequency. The frequency depends on the speed of the motion of the ROI. For example, if the image of ROI is read out 1000 times a second, the camera system can control the focus system of the camera lens 1000 times a second, without any interpolation. This frame rate is significantly higher than the response time of the lens therefore we need to consider the delay of the feedback loop into account to stabilize the system.

Figure 7:
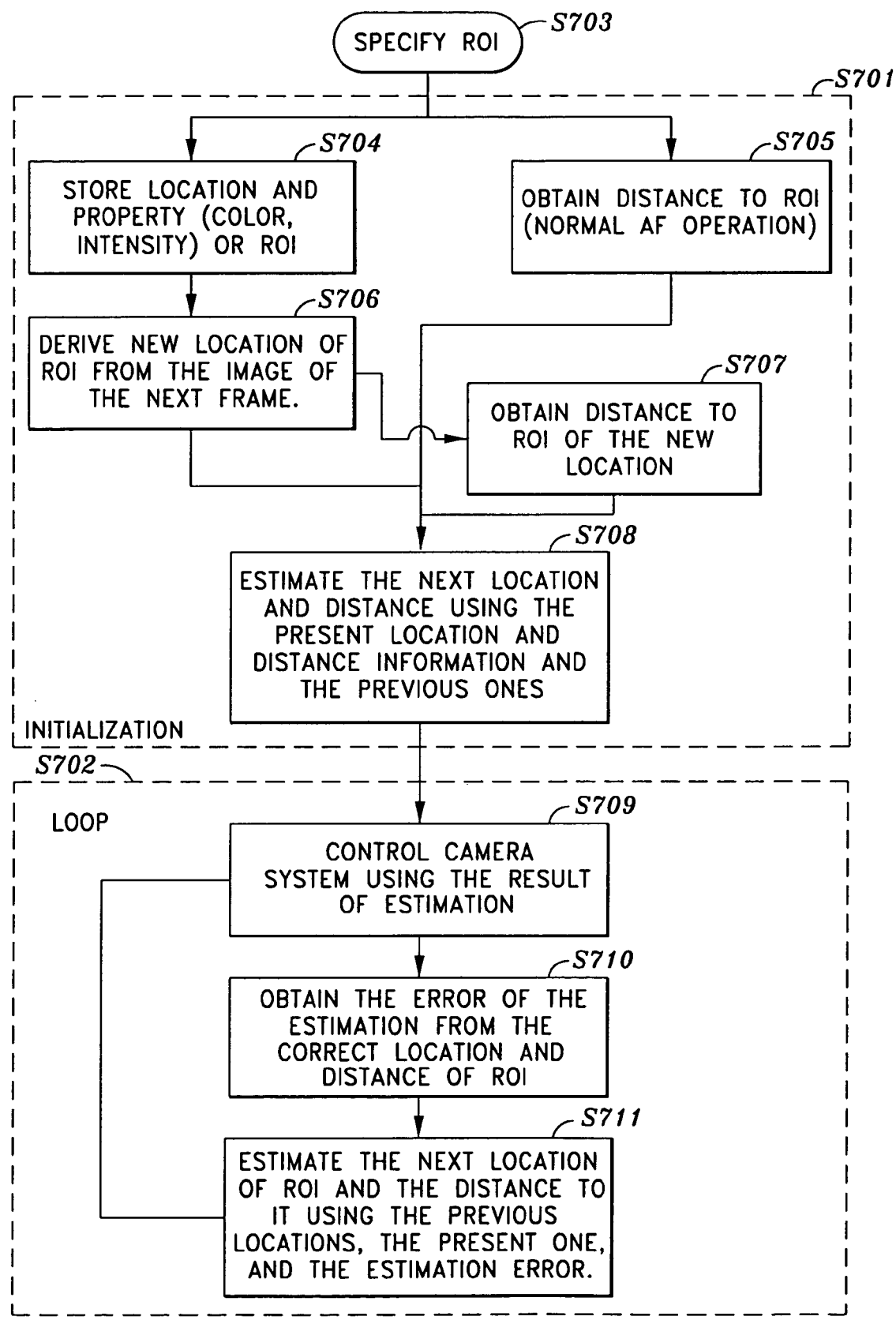
FIGS. 7, 8, 9 and 10 are flow charts for explaining operation of the embodiments of the invention.

FIG. 7 shows the control flow of the invention. The control consists of an initialization phase S701 and a loop phase S702. First of all, the ROI is specified at step S703. It is not possible to track the ROI of arbitrary motion unless the system knows the past positions, therefore the system just obtains the information of the position in the finder and the distance to the object without tracking operation for the very first two frames.

The system acquires the initial position at step S704, the initial distance at step S705 and the position and the distance corresponding to the next time at steps S706, and S707, respectively. Having sufficient information for motion estimation through the initialization process, the first estimation is done at step S708, which is the estimation for the coming next frame.

On the loop phase S702, the camera system 101 is controlled at step S709 in accordance with the estimation result. This feedback operation achieves continuous focusing on the ROI. However, the estimation usually the an error to the real position and distance. The error is measured at step S710. At step S711, the position and the distance is repetitively estimated using the present position and distance, and the past position and distance.

In this example, the method to specify the ROI is not limited to one case. For example, the method that a user specifies the ROI by a pointer and a button is preferred. Or, it is better for the system to have image recognition capability which enables the system to specify the ROI automatically by referring to the color, intensity and/or pattern of the image included in the ROI.

This example requires initialization phase in the control flow. However, initialization is not necessary when the motion of ROI is empirically obvious and therefore estimation can be started from the very first frame. Also, only the position and distance information of one frame before is used for estimation or more than one frames in the past can be used for the estimation. We need to redesign the initialization phase in a case where plural frames are used.

The initialization phase is not limited to this example. For example, it is preferred to include an exception handling when a user-specified ROI is hard or impossible to track.

The loop phase is not limited to this example. Error recovery tests and an abnormal termination function in case of tracking failure should be added preferably.

Figure 2:
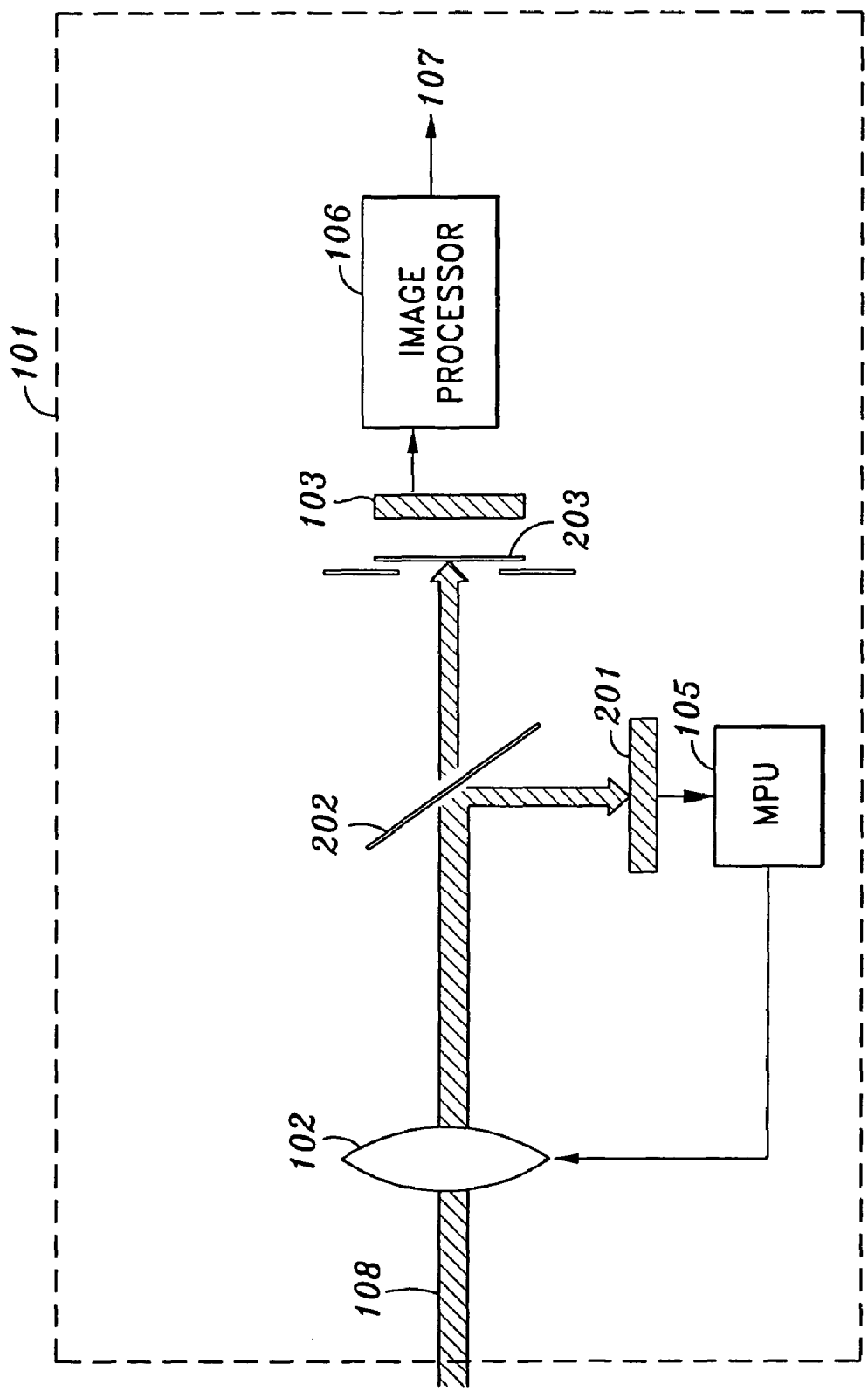

FIG. 2 shows the second example of the present invention. The first example used the area image sensor 103 for tracking the ROI; however in this example, an auto-focus sensor provides both an ROI capturing function and an estimation function. The detail of the figure is as follows. The same numbers are attached to the function blocks which are identical to FIG. 1. Auto-focus sensor 201 acquires the position of and the distance to the ROI at time n, and gives the information to processor 105. The processor 105 controls the lens system 102 using the information above, and therefore the ROI is continuously focused. 202 is a half-mirror normally used for the current Single Lens Reflex camera, which passes a part of the incoming light to the auto-focus sensor 201, and the rest of the light to the viewfinder. 203 shows the mechanical shutter unit. This figure is not to limit the embodiment of the example.

Specifically, auto-focus sensor 201 has to do the auto-focus operation and the image acquisition almost at the same time. Therefore, Japanese Patent Laid-Open No. 2001-250931 can be used preferably in this example. When the system is designed so that only one dimensional motion (for example, only horizontal, or only vertical motion) has to be estimated, the image acquisition of the ROI can be done by linear auto focus sensor, such as described in Japanese Patent Laid-Open No. H09-43502. The embodiment of this example is not limited to the application of the above mentioned sensors. The auto-focus sensor which is possible to obtain the position information in a finder and the distance information is sufficient for the realization of this example.

Usually the signal used for the auto-focus operation has to have a high signal to noise ratio. For example, if the position information is acquired by an auto-focus sensor with the frame rate of 1000 frames per second, because of short exposure time, the signal to noise ratio sometimes becomes too low for auto-focus operation, depending on the amount of illumination. In such a case, averaging in the time domain yields an effective high signal to noise ratio, reducing random noise in the averaged signal. This averaging enables the system to focus correctly and estimate the next position even when the illumination is low.

Figure 3:
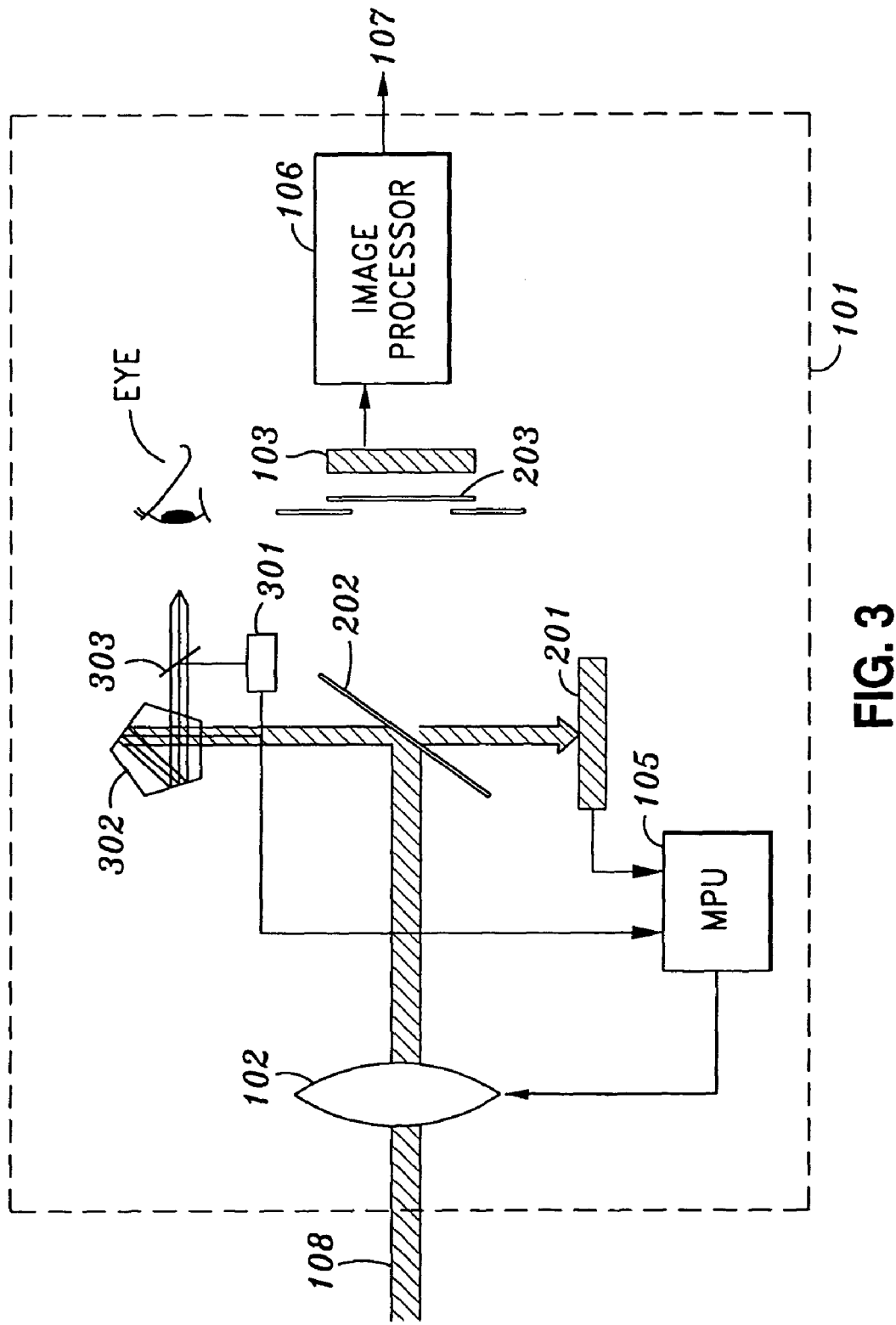

FIG. 3 shows the third example of the present invention. The same numbers are attached to the blocks which are identical to FIG. 1. In the second example, auto-focus sensor 201 had the estimation function. In this example, the sensor for tracking ROI 301 is located at the finder block. The incoming light ray reflected at half mirror 202 goes to the sensor 301, with another reflection at the half mirror 303 of penta-prism block 302. 301 acquires the location information as the image sensor in the first example does, and the lens system 102 is controlled in accordance with the result of the estimation. The sensor 301 can be designed so that it has both the ROI image acquisition function and an auto-exposure sensor function. In this case, the sensor 301 should preferably have a higher image acquisition rate than the area image sensor 103. For image acquisition for auto-exposure in low signal to noise ratio, which sensor 301 needs to take into account, it is resolved by the same method as it is done in the second example, i.e., by the averaging in the time domain.

Figure 4:
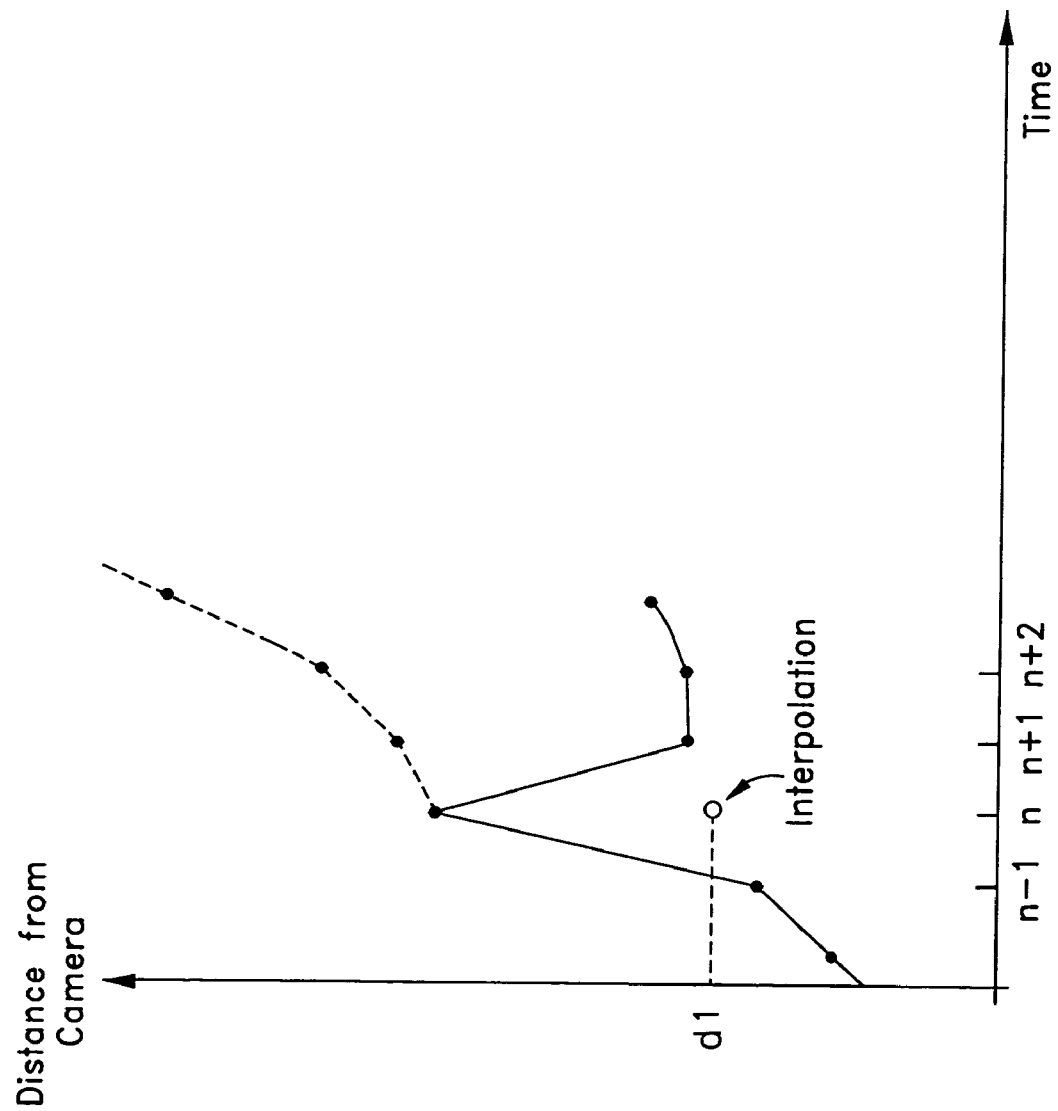

The tracking of an ROI is not always possible. The system sometimes loses the ROI, or tracks the wrong ROI in a case where the ROI is occluded by another object or the ROI has a deforming property which changes the appearance of the ROI (such as blinking eyes). When such cases happen, the errors can be corrected by the assumption that the distance does not change drastically. FIG. 4 describes the example.

FIG. 4 is the conceptual drawing of the distance to the ROI for a given time. The dotted line in FIG. 4 is the example when the system switched to focus on a wrong ROI and the information corresponding to the wrong ROI was picked up at time n. It is not possible to detect whether the tracking is erroneous or not at that time. If the system believes the wrong position and controls the lens system in accordance with wrong distance corresponding to the wrong position, the lens system has to be significantly controlled. The significant error makes the actual ROI out of focus. With the current invention, the lens system is not controlled in such a manner. The lens is controlled with reference to the distance information of the time n+1, n+2, ... after time n. Following is an example of the lens control of the present invention.

In the present invention, the distance at time n is not directly fed back to the lens system. Instead, the lens focuses on the distance dl at time n, which is within a reasonable range of a linear interpolation. At time n+1, the system tests the distance to ROI again.

As we can see on the solid line of FIG. 4 as an example, if tracking again becomes normal state i.e., if the distance to the ROI at time n+1 is within a reasonable range expected from the history, the system finds that the distance information at time n is wrong. The system is able to continue tracking and estimation operation after the time n+1. On the contrary, if the distance to the ROI at time n+1 is closer to the distance obtained at time n as is seen on the dashed line on FIG. 4, the system knows the significant change of the distance is real motion of the object, and controls the lens in accordance with the distance information at time n+1.

Figure 8:
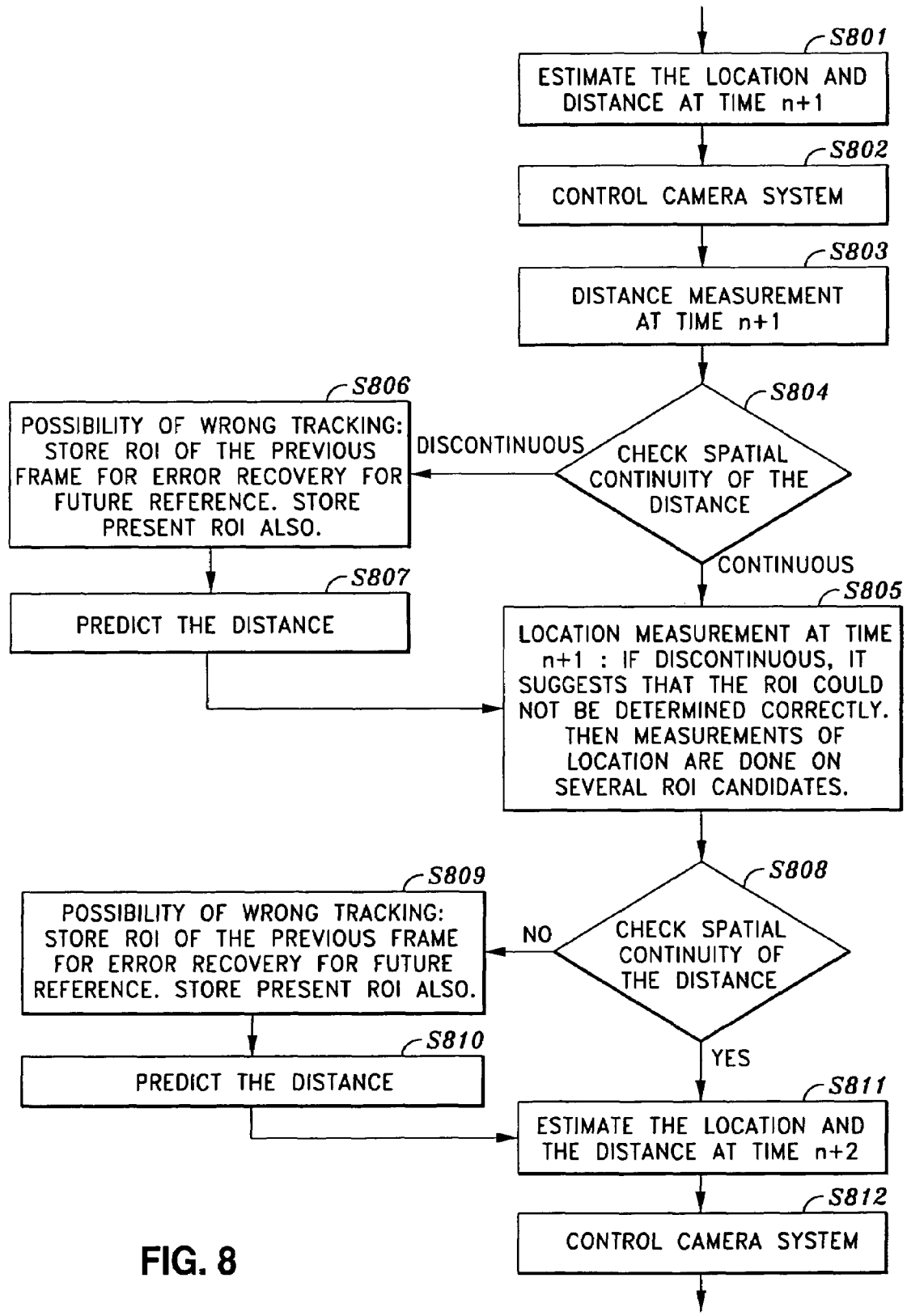

FIG. 8 is an example flow of the present invention. At step S801, the position and distance of the ROI of the time n+1 is estimated. The lens is controlled at step S802 using the estimation. After the control, the difference between the estimation and the real data is calculated. More specifically, the distance to the ROI is measured at step S803. The comparison between the previous distance and the current distance is done at step S804 in order to test whether the distance is gradually changed. If it is gradually changed the position is acquired at step S805, However, if the distance is known to be changed significantly at step S804, then the feature of the current image of ROI and that of the previous image of ROI are stored on a memory at step S806 and the distance is estimated (step S807) and interpolated without using the measured distance of time n+1. Then the position information is sampled at step S808. Since two ROIs has have been stored as candidates, the system measures two distances corresponding to the two ROIs. For each distance information, the system tests which of the distances can be regarded as the result of reasonable transition. If one of the ROIs has a reasonable distance, that distance is used for lens system control. If neither of them is in reasonable range, the system stores the current image of the ROI again (step S809), and interpolates the distance at n+2 without current distance information. The position and distance of ROI of time n+2 are measured at S811, and the camera system at S812.

Here, the definition of continuity is, for example, that the continuity is lost if the absolute value of derivative of the distance in time exceeds a certain limit. The threshold of the limit is a design parameter, and it is also possible that a user can specify the value by himself.

When the continuity is lost for several frames, it suggests that it is impossible to recover tracing of the ROI. Therefore, trace and estimation should be aborted with an error signal. Here, the number of frames allowed to operate without continuity is a design parameter. If the user wants to track the ROI at high speed, the number should be made small.

Continuity of both distance and position are tested at FIG. 8. However it is also possible to test only one of them.

FIG. 5 shows the fifth example of the present invention. The motions of surrounding features around the ROI are assumed to have continuity. Tracking error can be recovered using this assumption. Point 501 is the point which represents the ROI, and points 502 to 505 are points around point 501 to be used to recover the tracking error. For example, if point 501 disappears at time n+1, as shown in FIG. 5B), or it shows peculiar motion, normally we will lose the ROI and tracking is no longer possible. By the present invention, as long as points 502 to 505 keep a reasonable shape (in this example, a square-like shape), we can presume that the point 501 is inside the box. We can wait until the ROI recovers by tracking the polygon created by points 502 to 505.

Figure 9:
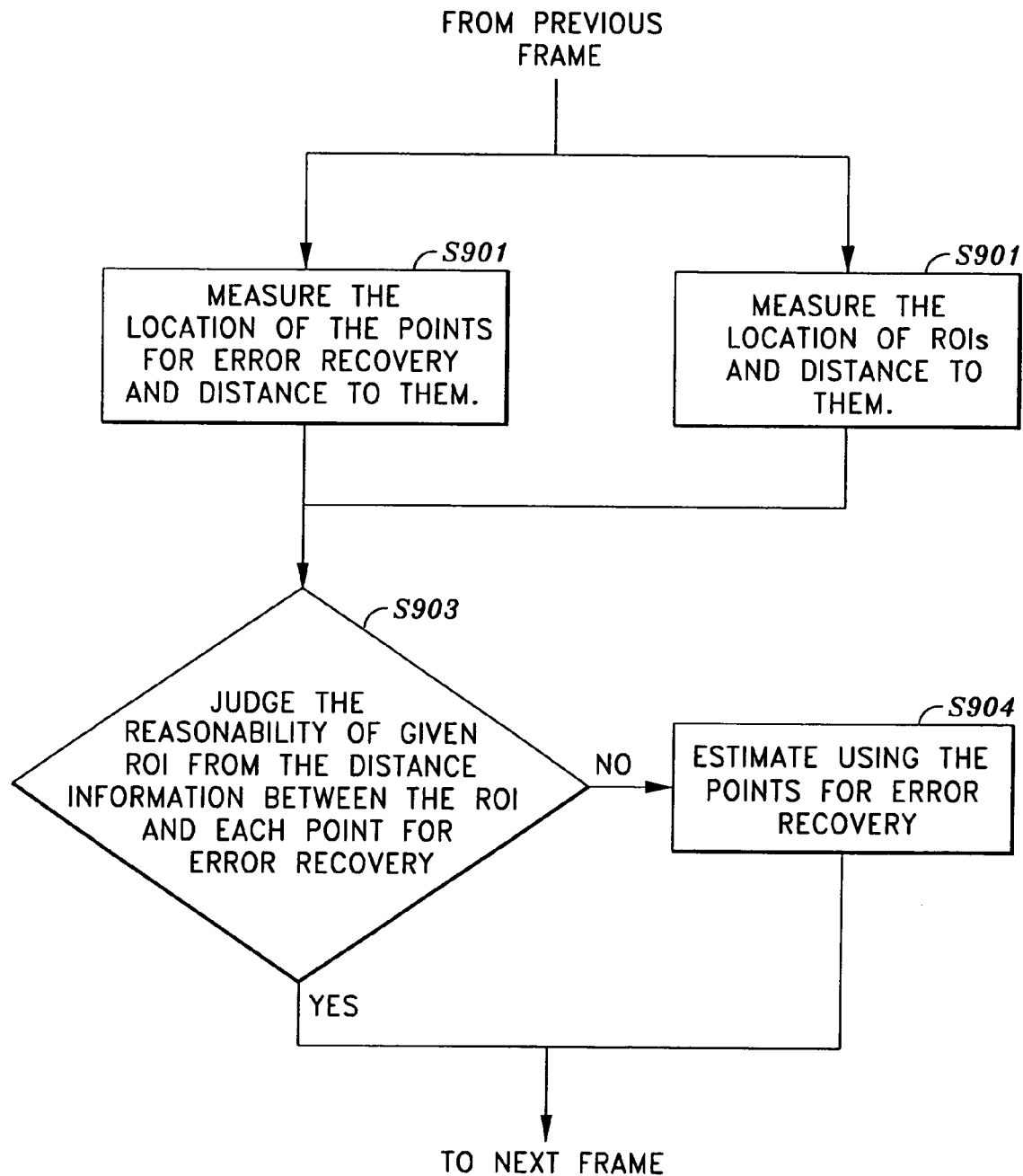

FIG. 9 is an example of the control flow. The points for error recovery and the point corresponding to ROI are both processed parallel in time, and their position and distance are calculated at steps S901 and S902. At step S903, the point corresponding to the ROI is tested to determine whether it is moving reasonably or not. The criterion for reasonability is, for example, that the point is located inside the polygon created by the points for error recovery.

If the above test fails, it suggests that features of the ROI itself are also not correct. In this case, the ROI of the previous frame is again recalled. Since the tracking was successful at that time, this feature of ROI is more reliable than that of the current frame. At the next frame, tracking is recovered if there is a match with the recalled ROI. If the ROI appears in the reasonable location, it can be said that the error is recovered. Then the system continues to track the ROI and estimate the feature location.

When the ROI is lost, needless to say, the motion is not reasonable. Then the estimated position of the point is calculated at step S904 and the position is set at the estimated location.

When the point corresponding to the ROI and some of the points for error recovery shows peculiar motion, it suggests that wrong tracking has been made due to some noise in an input image. In this case, we can recover the tracking and estimation by searching the ROI around all the points for error recovery, using template matching, matched filter and so on, for example, and picking up the region which shows the best match to the ROI.

Figure 10:
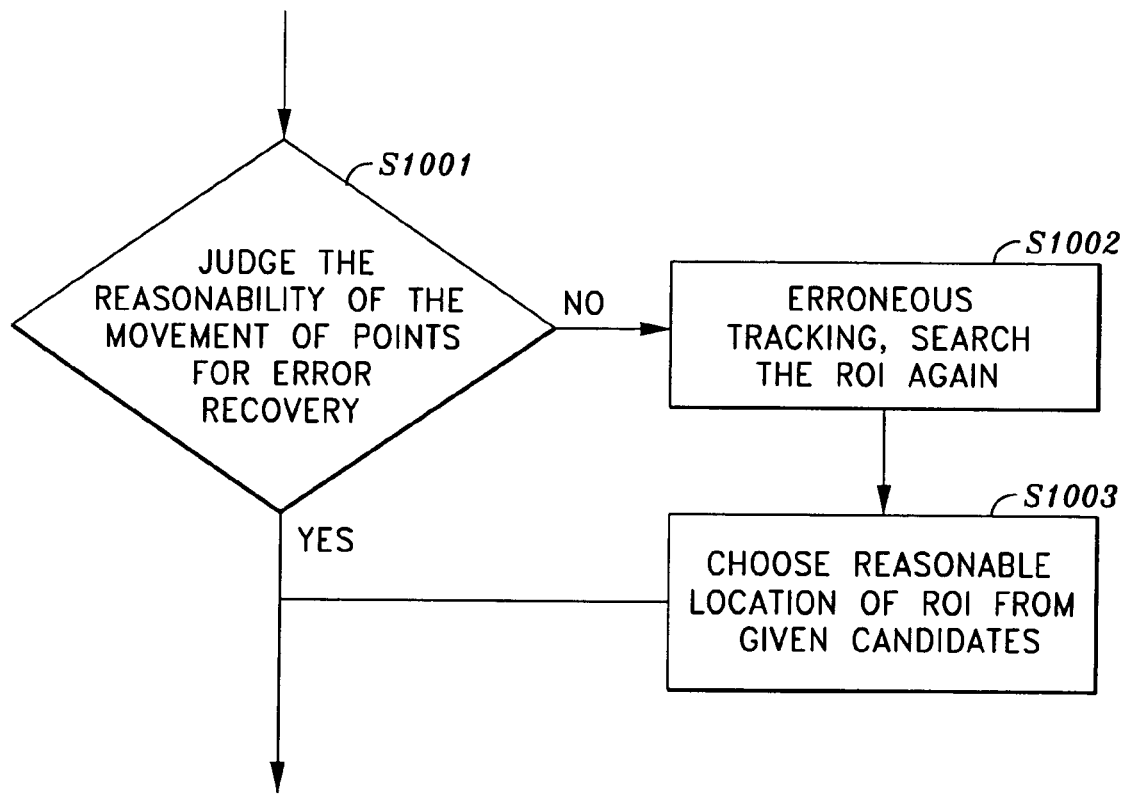

FIG. 10 is an example of control flow. The motion of all points for error recovery are tested at step S1001. If one of the points shows discontinuity, the system repeats tracking of the point again at S1002. At step S1002, a dedicated search of the ROI is done on the image with the assumption that each distance between the ROI and the point for error recovery is nearly constant in a given frame. At step S1003, the search result is examined to determine whether it is reasonable or not, and the proper point is chosen as a new ROI if it exists.

Here, the definition of "proper polygon" formed by points for error recovery is just a design parameter. Only square shapes can be allowed if strict tracking is required. Deformed trapezoids can be allowed if loose tracking is permitted.

Here the number of the points for error recovery is 4, however it is not limited to that number, and other numbers, like 2, 8, or an odd number can also be acceptable. For example, when it is more likely to lose the ROI, we can place many points around the ROI so that we can still track the ROI even if most of the points are lost. As for extrapolation of the center of the ROI using points for error recovery, the technique to calculate the center of gravity of the points, or to calculate the center of gravity of the points after removing the peculiar points which deviates from the group, can be used for instance.

As for the way to search the points for error recovery, we can search the ROI uniformly around the area where the ROI was in previous frames. Or, the search can be started from the expected area which is given by the relative distance between the ROI and the points for recovery of the previous frame.

One example to define an ROI is the use of color information. For instance, when the face is the object to be tracked, the center of gravity of the area of skin color region can be chosen as an ROI, and its motion can be tracked and estimated. The other color, for example, a red ball, or orange fruits, can also be chosen as the object. The point other than the center of gravity of the ROI can also be chosen as the point of interest.

Another example to define an ROI is to use the intensity pattern of the ROI. For this purpose, we can use Lucas-Kanade Method, Template matching, or Szeliski's spline-based method, for example. Needless to say, the algorithm is not limited to these examples.

Here is an example of the method to estimate the location of the ROI using previous locations. We can use the linear extrapolation of the point from the previous and current locations. It is also possible to estimate position from the speed or the acceleration of the previous and current motion. Another example is to use Kalman Filter, Extended Kalman Filter or Ensemble Kalman Filter, which yields to optimum estimation.

FIG. 6 is another example of the present invention. The ROI is regarded as an ideal "point" in the above, however, it merely is the real point of interest. When the image of an ROI is captured by an area image sensor with high resolution, it is hard to trace only one point corresponding to a single pixel. Normally the point is selected as a region which consists of several pixels. The size of the region depends on the size and the texture of the object of interest. For example, if the object of interest is located close to the camera, and the object has smooth graduation-like texture, the region should be large. If the object is located far from the camera, or the object has a lot of spatially-high frequency component, the region should be set small. However, it is really hard for user to control the region in real time.

The present invention has realized to assist the user by an automatic region selection method. FIG. 6 explains it in detail. FIG. 6A is the case when the object is relatively large in the finder. When the user selects the point of interest 601, then the region grows from the point as a center until the magnitude of the spatial difference for X-direction and Y-direction becomes sufficiently large for tracking. In FIG. 6B, the region specified by dotted line 602 does not have the magnitude enough to track, therefore it needs be enlarged. In FIG. 6C, the region 603 now has the enough magnitude for tracking, namely, the information about the edge of the object to be tracked, then the further enlargement of the region is stopped. The region can be either updated on each frame, or stay the same size across frames. The region can be expanded to only the X-direction, Y-direction or both. The magnitude of the spatial difference for the X-direction and Y-direction can be measured by the absolute sum or squared sum of the spatial difference, and it is compared with a certain criteria. This function can be assigned to a new button on the camera, or a partial-depressing of the shutter button.

Here, the point 601 can be moved and placed at any location on the finder by user operation. Also it is better to have the method to display both the point and the image acquired by the image sensor to the preview window so that the user can now specify the point of interest using the preview monitor.

What is claimed is:

1. An image pickup apparatus comprising:
    tracking means for automatically tracking location and distance of a predetermined point of interest, wherein location comprises horizontal and vertical positions in a viewfinder view of the point of interest, and wherein distance comprises a distance along an optical axis to the point of interest;
    estimating means for, based on each information on continuity of locations and distances of the point of interest at present, n, and in past, n−1, estimating a location in a viewfinder view of the point of interest in future n+1, and also estimating a distance in the viewfinder view of the point of interest in future, n+1; and
    controlling means for controlling to focus on the point of interest based on an output of said estimating means.

2. The apparatus according to claim 1, further comprising an area image sensor, and wherein said controlling means controls to focus on the point of interest by using a signal from at least a part of said area image sensor.

3. The apparatus according to claim 1, further comprising a focus sensor, and wherein said controlling means controls to focus on the point of interest by using a signal from at least a part of said focus sensor.

4. The apparatus according to claim 1, further comprising a light metering sensor, and wherein said controlling means controls to focus on the point of interest by using a signal from at least a part of said light metering sensor.

5. The apparatus according to claim 2, wherein said controlling means discards signals of a region which is not used for tracking, and reads out at high speed a region to be tracked for the point of interest.

6. The apparatus according to claim 5, wherein said control means discards the signal of non-neighboring regions of the point of interest.

7. The apparatus according to claim 1, further comprising means for correcting errors based on temporal continuity of the distance information.

8. The apparatus according to claim 1, further comprising correcting means for correcting errors based on spatial continuity of motion of the point.

9. The apparatus according to claim 1, wherein said controlling means controls by using object color information as tracking information.

10. The apparatus according to claim 1, wherein said controlling means controls by using object illumination information.

11. The apparatus according to claim 1, wherein said controlling means detects motion of the point of interest using a time differential component and a space differential component of illumination information around the point of interest.

12. The apparatus according to claim 1, wherein said controlling means estimates the motion of the point of interest by using template matching.

13. The apparatus according to claim 1, wherein said controlling means estimates the motion of the point of interest by using a Kalman Filter.

14. The apparatus according to claim 1, further comprising specifying means for specifying the point of interest on a finder or a preview monitor; and
    calculating means for calculating to select a region of interest based on the specified point of interest.

15. A method for an image pickup, comprising the steps of:
    automatically tracking location and distance of a point of interest, wherein location comprises horizontal and vertical positions in a viewfinder view of the point of interest, and wherein distance comprises a distance along an optical axis to the point of interest;
    based on each information on continuity of locations and distances of the point of interest at present, n, and in past, n−1, estimating both a location in a viewfinder view of the point of interest in future n+1, and also estimating a distance in the viewfinder view of the point of interest in future, n+1; and
    controlling to focus on the point of interest based on the estimated location and distance.

16. The method according to claim 15, wherein a signal from at least a part of an area image sensor is used for controlling.

17. The method according to claim 15, further comprising the step of correcting errors based on temporal continuity of the distance information of the point of interest.

18. The method according to claim 15, further comprising the step of correcting errors based on spatial continuity of motion of the point of interest.

19. The method according to claim 15, further comprising the steps of:
    specifying the point of interest on a finder or a preview monitor; and
    calculating to select a region of interest based on the specified point of interest.

20. A computer readable medium having recorded thereon a computer-executable computer program iniplementing the steps defined in claim 15.

* * * * *

UNITED STATES PATENT AND TRADEMARK OFFICE
CERTIFICATE OF CORRECTION

| | |
|---|---|
| PATENT NO. | : 7,423,686 B2 |
| APPLICATION NO. | : 10/385847 |
| DATED | : September 9, 2008 |
| INVENTOR(S) | : Yuichiro Yamashita |

Page 1 of 1

It is certified that error appears in the above-identified patent and that said Letters Patent is hereby corrected as shown below:

<u>COLUMN 8</u>
  Line 56, "iniplementing" should read --implementing--.

Signed and Sealed this

Twenty-fourth Day of February, 2009

JOHN DOLL
*Acting Director of the United States Patent and Trademark Office*